July 28, 1959    J. J. HAGOPIAN    2,896,456
MOTION TRANSMISSION DEVICE

Filed Feb. 16, 1954    2 Sheets-Sheet 1

INVENTOR.
JACOB J. HAGOPIAN
BY
John B. Aponte
AGENT

July 28, 1959     J. J. HAGOPIAN     2,896,456
MOTION TRANSMISSION DEVICE

Filed Feb. 16, 1954     2 Sheets-Sheet 2

INVENTOR.
JACOB J. HAGOPIAN
BY
John B. Sponsler
AGENT

United States Patent Office 2,896,456
Patented July 28, 1959

2,896,456

MOTION TRANSMISSION DEVICE

Jacob J. Hagopian, San Jose, Calif., assignor to International Business Machines Corporation, a corporation of New York Application February 16, 1954, Serial No. 410,595

6 Claims. (Cl. 74—18)

This invention relates to a method and means for transmitting mechanical movement or force in response to a magnetic field. More particularly the invention comprises a novel mechanism which will transmit motion in the presence of a magnetic field. A device of the kind shown in this invention may be adapted to operate in a varied number of applications, for example, in punching, printing, switch actuating, and other applications known to those familiar with the art.

In the design and construction of motion transmitting devices activated by magnetic means and containing magnetic fluid or mixture, it has been difficult to contain the fluid mixture within the device without leakage. Therefore, it is an object of this invention to provide a transmission device using a magnetic powder mixture or fluid therein with no joining surfaces through which the powder or fluid may escape.

Other objects of this invention will become clear in the following description and claims and illustrated in the accompanying drawings which disclose, by way of example, the principle of the invention and the best mode which has been contemplated for applying the principle.

Figure 1:
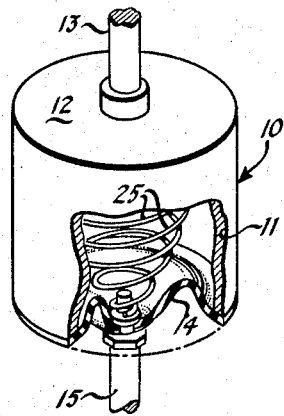
Fig. 1 is a perspective view of an embodiment of the invention with a section cut away in order to show the inner structure thereof.
Figure 4:
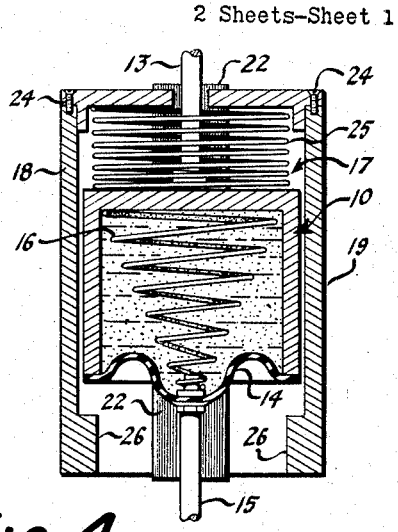
Fig. 4 is a partial view of Fig. 2 in the operated position.

An understanding of the invention may be obtained from Fig. 1 in the drawings wherein a hollow cylinder 10 is shown, having a cylinder wall 11 made of non-magnetic, rigid material. One end of cylinder 10 is covered by a non-magnetic, rigid cover plate 12. A driven rod 13 is rigidly connected to the outer surface of the cover plate 12. The other end of the cylinder 10 is covered by a resilient, non-porous material circumferentially attached to the wall of the cylinder, thereby forming a diaphragm 14. The material forming the diaphragm 14 may be rubber, leather, plastic, flexible metal, as well as other suitable resilient, non-porous materials. A driving rod 15 is attached to the center of the diaphragm 14. All joints and openings between the cylinder and all connecting surfaces are sealed.

The interior of cylinder 10 is filled with a mixture of magnetizable particles, such as iron, nickel or steel powder, in an oil or silicone mixture. A dry mixture of such a magnetizable powder may be used alone or in a mixture with graphite particles, if desired. These mixtures are normally a fluid and, when in the cylinder 10 and when subject to a pressure, are displaceable because of the combination of the fluid nature of the material and the flexibility of the diaphragm 14. Therefore, when the driving rod 15 is pushed toward the cylinder 10, the force created thereby is transmitted by the fluid within the cylinder to all inner surfaces, and the diaphragm bulges as in Fig. 2, thereby displacing the mixture and absorbing the force applied. If, however, the driving rod 15 is moved toward the cylinder 10 when the mixture is subjected to a magnetic flux, the magnetizable particles of the mixture align with the lines of flux thus created, and in so doing tend to resist any displacement, and the force and motion supplied by the driving rod 15 is transmitted through the mixture to the cover plate 12 and to the driven rod 13. A driving rod reset spring 16 is fitted within the cylinder 10 to the inner surface of the cover plate 12 and diaphragm 14. When rod 15 is no longer pushed toward the cylinder 10, the spring 16 urges the diaphragm 14 and rod 15 to return to the normal position as shown in Fig. 3.

Figure 2:
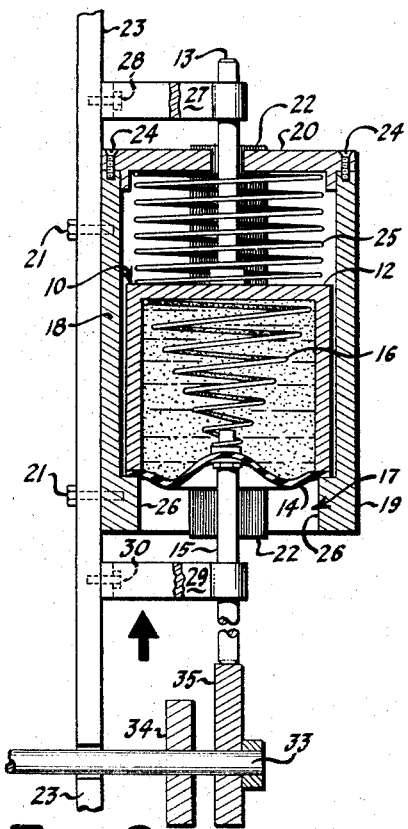
Fig. 2 is a partial sectional view of an embodiment utilizing the structure of Fig. 1.
Figure 3:
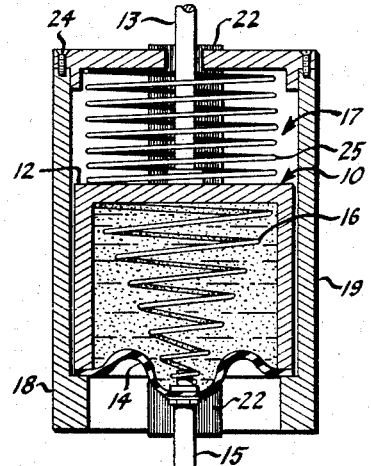
Fig. 3 is a partial sectional view of the device of Fig. 2 in its normal position.
Figure 5:
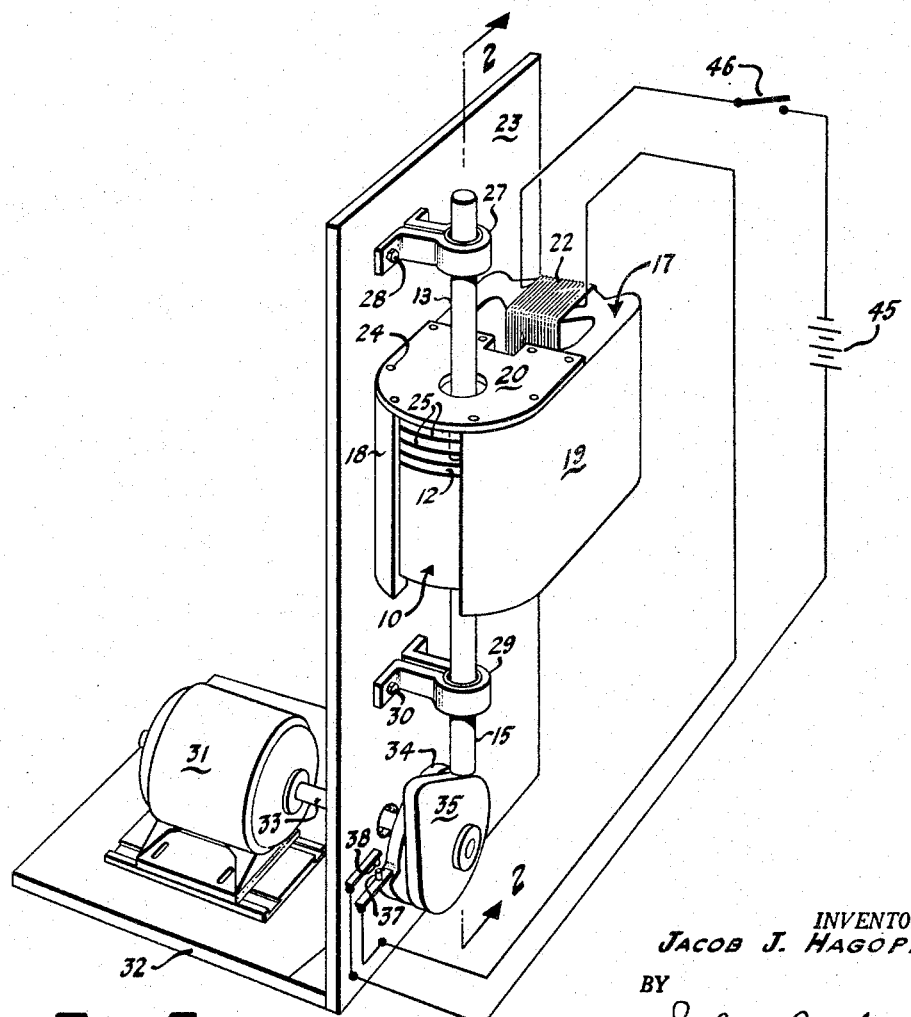
Fig. 5 shows a further embodiment as shown in Figs. 2, 3 and 4, with appropriate controlling circuitry as hereinafter explained.

With reference to Figs. 2, 3, 4 and 5, a structure, as shown and described above in connection with Fig. 1, is shown in a preferred embodiment to better illustrate the invention. The cylinder 10 is surrounded by magnetic core members 18 and 19 of an electromagnet 17 having a winding 22. The electromagnet 17 is attached to a base 23 by screws 21 through the base 23, which are fixed in the core member 18 as shown in Fig. 2. A cover plate 20 is fitted and attached to the core members 18 and 19 by screws 24. A hole is provided in the cover plate 20 for the clearance of the driven rod 13. A preloading spring 25 is placed within the area bordered by cover plate 12 and cover plate 20 and the core members 18 and 19 as shown in Figs. 2, 3, 4 and 5. The spring 25 is positioned to urge the cylinder 10 downward from the cover plate 20. The cylinder 10 is held between the core members 18 and 19 against the pressure of the spring 25 by a shoulder 26 which extends inwardly from the lower side of the core members 18 and 19. A bearing 27 is attached to the base member 23 by screws 28. The driven rod 13 is supported by the bearing 27 which guides rod 13. Similarly, a bearing 29 is attached to the base 23 by screws 30 for supporting and guiding the rod 15. A motor 31 is affixed to an extension 32 of the base member 23. A shaft 33, upon which cams 34 and 35 are mounted, is attached to the motor 31. Cam 35 is arranged to operate the driving rod 15 upwardly toward the cylinder 10 once per revolution of the shaft 33. The cam 34 rotates concurrently with the cam 35 and is arranged to close a single pole, single throw switch, having normally open contacts 37 and 38, once per revolution. The energizing circuit for the electromagnet 17 is shown in Fig. 5 and includes a winding 22, the contacts 37 and 38, a battery 45 and a contact switch 46.

Figure 6A:
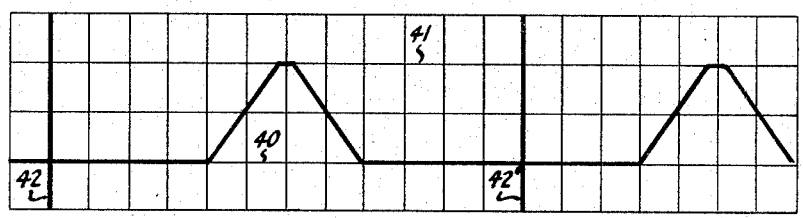
Fig. 6a is a graph illustrating the function of the mechanism of Fig. 5 during operation.
Figure 6B:
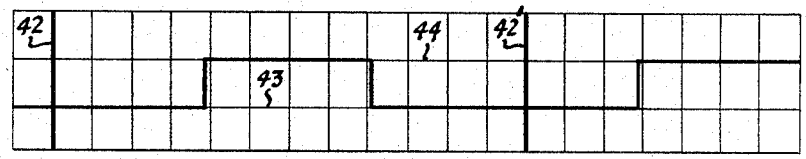
Fig. 6b is a graph illustrating the condition of the control circuits of Fig. 5 during operation.

Figs. 6a and 6b show the timing relationship. The movement of the driving rod 15 is shown in Fig. 6a by the coordinates 40 and 41 which represent, respectively, the normal and the operated positions of the driving rod 15. A cycle of operation is illustrated in Figs. 6a and 6b as indicated by the lines 42 and 42'. The operation of contacts 37 and 38 is shown in Fig. 6b by coordinate 43 which indicates the full open position and coordinate 44 indicating the closed position. The timing of cams 34 and 35 is set so the contacts 37 and 38 close before the rod 15 is cammed upwardly and will remain closed until the driving rod 15 returns to its normal position.

With switch 46 open, driving rod 15 is driven upwardly toward the cylinder 10 by cam 35 and is urged downwardly by spring 16. The force and motion resulting therefrom is dissipated by the displacement of diaphragm 14 by the fluid within the cylinder and by the pressure from spring 25, as in Figs. 2 and 3. With switch 46 closed, electromagnet 17 generates a magnetic field. The fluid within the cylinder 10 is caused to align with the lines of flux of the field, and the upward force and motion by the rod 15 is transmitted to the cylinder 10 and the rod 13, as in Fig. 4. Cylinder 10 and rod 13 are returned to their normal position by spring 25 when cam 35 is idle. For the effective operation of a magnetic clutch in the illustrated embodiment, it is preferable that the magnetic field be initiated when the cylinder 10 and the driving rod 15 are in the normal position as shown in Fig. 3 and represented by the coordinate 40 of Fig. 6a, since little or no motion is transmitted to the driven rod 13 otherwise. Cam 34 is so timed that when switch 46 is closed the cylinder 10 is subjected to a magnetic field only when the driving rod 15 is being operated by cam 35. This insures the return of the driving rod 15 by springs 16 and 25 to the normal position as shown in Fig. 3 during the period when cam 35 is idle.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A motion transmitting device including a driving member and a driven member, means interposed between said members for selectively controlling the transmission of force therebetween comprising an open ended container affixed to one said member and a flexible diaphragm sealing the opening of said container, said diaphragm being operatively affixed to the other said member, a magnetic liquid within said container normally displaceable by motion of said driving member distorting said diaphragm whereby said motion is absorbed, and means for selectively rendering said liquid non-displaceable so that motion is transmitted between said members.

2. The invention set forth in claim 1 wherein the said rendering means comprises a selectively controlled magnetic flux.

3. The invention according to claim 1 wherein the said rendering means comprises an electromagnet for selectively acting upon said liquid.

4. A motion transmitting device including a driving member and a driven member, means interposed between said members for selectively controlling the transmission of force therebetween comprising an open ended container affixed to one said member and a flexible diaphragm sealing the opening of said container, said container being operatively affixed to the other said member, a magnetic liquid within said container normally displaceable by motion of said driving member distorting said diaphragm whereby said motion is absorbed, means for restricting the direction of motion of said transmitting means to that of the said members, and means for selectively preventing displacement of said liquid whereby motion is transmitted between said members.

5. A motion transmitting device including a driving member and a driven member, means interposed between said members for selectively controlling the transmission of force therebetween comprising an open ended container affixed to one said member and a flexible diaphragm sealing the opening of said container, said container being operatively affixed to the other said member, a magnetic liquid within said container normally yielding to displacement within said container to distort said diaphragm for absorbing the effect of motion of said driving member, and means for selectively preventing displacement of said liquid whereby motion is transmitted between said members.

6. A motion transmitting device including a driving member and a driven member, means for selectively transmitting force between said members comprising an open ended container affixed to one said member and a flexible diaphragm sealing the opening of said container and operatively affixed to the other said member, a magnetic liquid within said container normally flowing to expand said diaphragm under the effect of the motion of said driving member, and means to selectively solidify said liquid whereby motion is transmitted between said members.

References Cited in the file of this patent

UNITED STATES PATENTS

| | | |
|---|---|---|
| 701,983 | Yale | June 10, 1902 |
| 957,315 | Duncanson | May 10, 1910 |
| 2,272,950 | Mercier | Feb. 10, 1942 |
| 2,313,941 | Humphrey et al. | Mar. 16, 1943 |
| 2,616,984 | Paré | Nov. 4, 1952 |
| 2,633,155 | Wallerstein, Jr. | Mar. 31, 1953 |
| 2,648,413 | Russell | Aug. 11, 1953 |
| 2,661,596 | Winslow | Dec. 8, 1953 |
| 2,665,789 | Ingersoll | Jan. 12, 1954 |
| 2,667,237 | Rabinow | Jan. 26, 1954 |
| 2,668,455 | Herrmann | Feb. 9, 1954 |
| 2,688,884 | Warmoes et al. | Sept. 14, 1954 |
| 2,792,536 | Immel | May 14, 1957 |

FOREIGN PATENTS

| | | |
|---|---|---|
| 452,424 | Germany | Nov. 11, 1927 |
| 576,687 | Great Britain | Apr. 16, 1946 |

OTHER REFERENCES

The Magnetic Fluid Clutch, transactions of AIEE, 33 W. 39th St., N.Y., N.Y. vol 67, 1948; Dec. 13, 1948; made available for printing Sept. 3, 1948; paper 48-238.

UNITED STATES PATENT OFFICE
CERTIFICATE OF CORRECTION

Patent No. 2,896,456                                July 28, 1959

Jacob J. Hagopian

It is hereby certified that error appears in the printed specification of the above numbered patent requiring correction and that the said Letters Patent should read as corrected below.

Column 3, line 58, and column 4, line 1, claim 4, strike out "container" and insert instead -- diaphragm --; column 4, lines 14 and 15, claim 5, strike out "con-tainer" and insert instead -- diaphragm --.

Signed and sealed this 8th day of March 1960.

(SEAL)
Attest:

KARL H. AXLINE                                    ROBERT C. WATSON
Attesting Officer                                   Commissioner of Patents